United States Patent
Foschiano et al.

(10) Patent No.: US 7,792,113 B1
(45) Date of Patent: Sep. 7, 2010

(54) METHOD AND SYSTEM FOR POLICY-BASED FORWARDING

(75) Inventors: Marco E. Foschiano, San Jose, CA (US); Venkateshwar R. Pullela, San Jose, CA (US); Justin Q. Chen, Palo Alto, CA (US); Robert C. Benea, Santa Clara, CA (US); Maurizio Portolani, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1237 days.

(21) Appl. No.: 10/274,608

(22) Filed: Oct. 21, 2002

(51) Int. Cl.
*H04L 12/28* (2006.01)
*H04L 12/56* (2006.01)

(52) U.S. Cl. ...................................... 370/392

(58) Field of Classification Search .................. 370/392
See application file for complete search history.

(56) References Cited

U.S. PATENT DOCUMENTS

| | | | |
|---|---|---|---|
| 6,104,700 A | 8/2000 | Haddock et al. | 370/235 |
| 6,308,228 B1 | 10/2001 | Yocum et al. | 710/52 |
| 6,393,026 B1 | 5/2002 | Irwin | 370/401 |
| 6,449,650 B1 | 9/2002 | Westfall et al. | 709/228 |
| 6,510,135 B1 | 1/2003 | Almulhem et al. | 370/229 |
| 6,687,247 B1 * | 2/2004 | Wilford et al. | 370/392 |
| 7,257,833 B1 * | 8/2007 | Parekh et al. | 726/1 |
| 2002/0073337 A1 * | 6/2002 | Ioele et al. | 713/201 |

* cited by examiner

*Primary Examiner*—Kevin C Harper
(74) *Attorney, Agent, or Firm*—Campbell Stephenson LLP; Samuel G. Campbell, III

(57) ABSTRACT

A method of operating a network is disclosed. The method includes identifying a packet as being subject to a policy and forwarding said packet based on said policy, if said packet is subject to said policy.

57 Claims, 9 Drawing Sheets

METHOD AND SYSTEM FOR POLICY-BASED FORWARDING

BACKGROUND OF THE INVENTION

1. Field of the Invention

The present invention relates to data communications, and, more particularly, to a method and apparatus for forwarding information between network elements based on a particular forwarding policy.

2. Description of the Related Art

As more and more information is transferred over today's networks, businesses have come to rely heavily on their network infrastructure in providing their customers with timely service and information. While the benefits of such a network infrastructure are legion, such benefits are not without cost. Network infrastructures that are used to provide such functionality can be costly both in monetary terms and in terms of company resources expended to support such infrastructure. Moreover, a proliferation of network infrastructure involves an ever increasing need for management of the network.

Thus, among the insistent requests voiced by users of such networks is a need for solutions utilizing cheaper and less complex layer-2 configurations. In an Ethernet network employing an OSI protocol stack, a number of network elements operate on Layer 2, the Data Link Layer. This layer handles transferring data packets onto and off of the physical layer, error detection and correction, and retransmission. Layer 2 is generally broken into two sub-layers: The LLC (Logical Link Control) on the upper half, which performs error checking, and the MAC (Medium Access Control) on the lower half, which handles transferring data packets onto and off of the physical layer.

Because such network elements exist further down in the protocol stack, such they are typically simpler and less expensive than equipment that operates at a higher level in the network hierarchy. Not only simpler, such a solution should leverage existing (and particularly, installed) technologies. Thus, such solutions allow users to realize the huge potential of their (often large) deployed base of layer-2 networking elements (e.g., switches). However, such a solution should not involve the need for additional supporting hardware, if at all possible.

Preferably, such an approach would also be applicable to server farm switches, as well as proving valuable in an ample spectrum of configurations other than flat layer-2 networks. Specifically, the application of such an approach should be applicable to Internet Data Centers (IDC) and demilitarized zones (DMZs) for Content Switching and Firewall Load Balancing.

SUMMARY OF THE INVENTION

In one embodiment of the present invention, a method of operating a network is disclosed. The method includes identifying a packet as being subject to a policy and forwarding the packet based on the policy, if the packet is subject to the policy.

In another embodiment of the present invention, a network element is disclosed. The network element includes a forwarding engine. In turn, the forwarding engine includes a forwarding table. The forwarding table is configured to store a first destination address, which is a destination address of a policy-based forwarding engine.

In one aspect of this embodiment of the present invention, the forwarding engine also includes an adjacency table. In another aspect of this embodiment of the present invention, the forwarding engine also includes an access control list.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
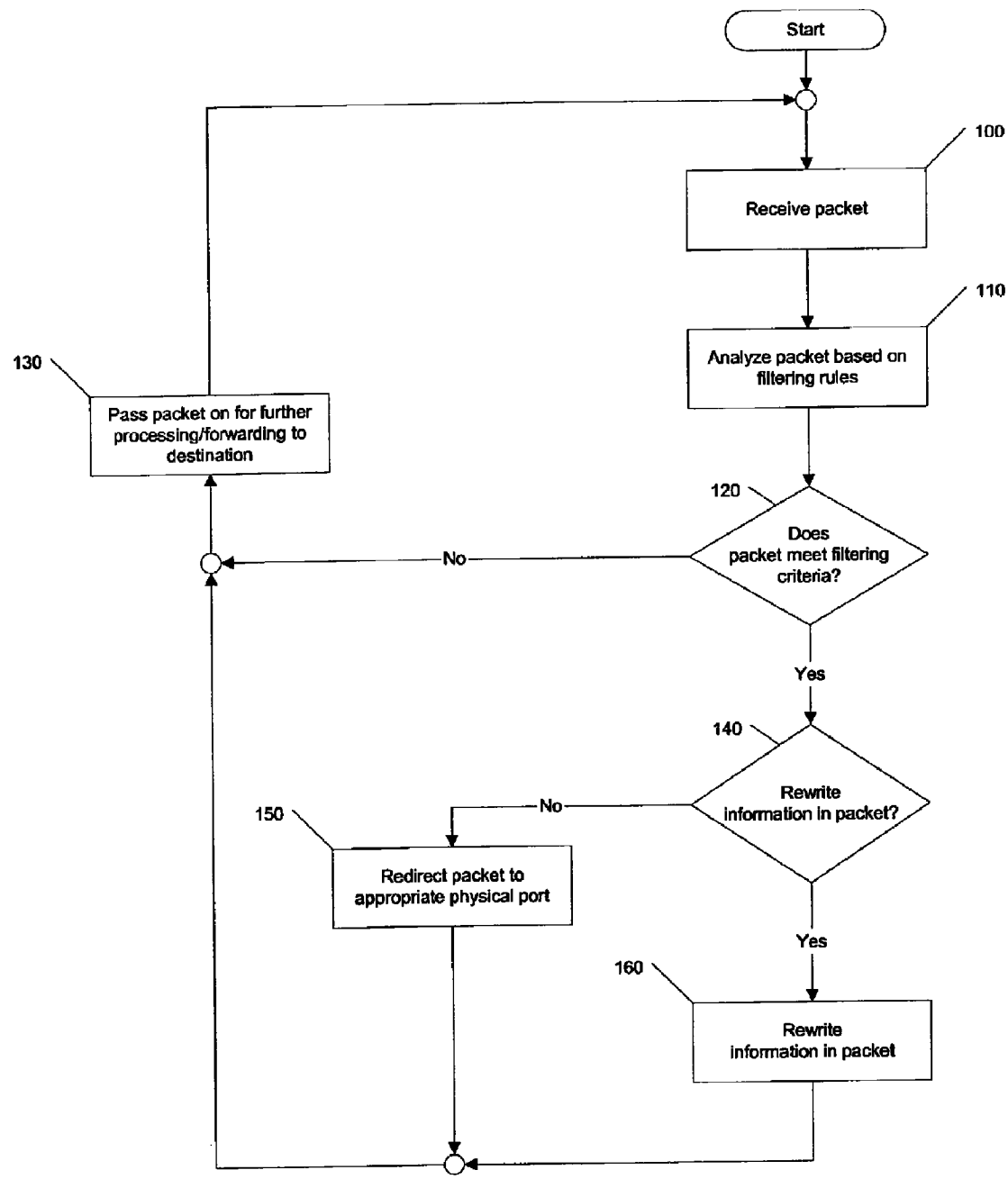
FIG. 1 is a flow diagram illustrating actions performed by a process according to an embodiment of the present invention.

The following is intended to provide a detailed description of an example of the invention and should not be taken to be limiting of the invention itself. Rather, any number of variations may fall within the scope of the invention which is defined in the claims following the description.

INTRODUCTION

The present invention provides for policy-based forwarding (PBF) of network traffic. PBF is a feature that makes possible, for example, forwarding of network traffic between two different VLANs without having a router. This is accomplished, for example, by recognizing and re-writing a portion of a given packet, such that the packet can then be forwarded between VLANs. By changing protocol information, the altered packet can then be forwarded based on an alternative set of forwarding rules (i.e., forwarding policy). Packets can be identified individually, or as being in a certain category or group of packets. In fact, any type of filtering mechanism according to the present invention, at any network level above the given forwarding level (e.g., level-2), can be used to filter packets in this manner (for identification with regard to forwarding). Moreover, and in particular, such a PBF scheme enables a switch in a pure L2 configuration to forward traffic between VLANs based on the source and destination IP addresses. The ability to enable connectivity between devices (specifically, management devices and managed devices) across different VLAN domains in a purely L2 network is an important advantage of the present invention.

A PBF technique according to the present invention typically includes two main parts: policy configuration and adjacency configuration. The policy configuration can take advantage of existing infrastructure (e.g., commands for VACL configuration, so that filtering capabilities of VACLs can be exploited by the user for PBF purposes). In addition, such a technique provides a way to configure a "virtual" MAC address for use as a destination address for any traffic sourced in one VLAN and destined for another VLAN (or for the same one, if source and destination VLANs match). Specifically, this virtual address can be an internal address (typically the default) or a user-programmed address; the purpose of such an address is to allow the hardware forwarding engine to make forwarding decisions on packets being "handed over" by the ACL engine after being policed.

A PBF technique according to the present invention also can also be configured to provide a command line interface to configure a static adjacency data structure, namely an adjacency descriptor, containing at least the minimal amount of information required by the forwarding engine to re-write a packet. In particular, this information typically includes the following parameters: destination VLAN, destination MAC address and, optionally, source MAC address. If a well-known default gateway address is not available, then the end stations should also be configured with a static ARP entry in order for them to properly direct their traffic toward the forwarding engine for hardware switching.

In particular, an attractive advantage of a PBF technique according to the present invention is that such a technique allows a simple, minimal way of statically routing between VLANs without the need for a router and without having to configure any extra L3 interfaces/subnets. Therefore, a purely L2 transparent network can be deployed and devices can be managed from different VLANs using simple network management protocol (SNMP), without the attendant difficulties presented by additional IP address management, save for that of the devices themselves. In addition, network designs with firewall clusters and load balancers are able to seamlessly employ less expensive PBF-enabled layer-2 switches to reduce the overall network complexity and the manageability problems of extra IP subnets.

A variety of applications can find benefit in such a technique. An important advantage of a PBF technique according to the present invention is that such a technique enables policy-based inter-VLAN traffic forwarding on, for example, a pure layer-2 network without the need for routers, subnetting, configuration and maintenance of extra IP addresses or the like. Such an approach is therefore beneficial in flat, layer-2 network used for transparent bridging where extra configuration and management of subnets is undesirable, or in certain cost-sensitive applications in which a layer-2 switch can be used in lieu of a more expensive layer-3 switch to achieve a more cost-effective design, for example.

As noted, in pure layer-2 transparent networks, devices can directly communicate across VLANs if an appropriate policy (VACL) is configured on a PBF-enabled switch. So, for example, in internet data centers, such a PBF technique can be used to intercept traffic traversing a VLAN in order for that traffic to be processed by a device other than the default gateway (for instance, a load balancer). The servers in such a data center configured in this manner are not aware of the presence of this device, as the servers are configured only with the default gateway address. The PBF feature intercepts traffic based on, for example, the L3/L4 information, and rewrites the destination MAC address to the MAC address of the L3 device with the following advantages:

1. Transparent to the servers;
2. Offloading of the router; and
3. Saves subnet allocation.

A PBF technique according to the present invention can also be used to achieve firewall load balancing. In one configuration, a cluster of firewalls are "front-ended" by a policy-based routing (PBR)-capable router, while the "back-end" is simply an L2 network using policy-based forwarding to redirect traffic from servers consistently with the "front-end" PBR configuration. This configuration rids the network designer of the necessity for a router in the back-end. In networks employing a DMZ ("demilitarized zone"; discussed subsequently), another possible application of PBF is to have a segment of servers "front-ended" with multiple (e.g., 2) clusters of firewalls. For example, if two server clusters were employed, one cluster gives privileged access to the server farm from internal clients. The other firewall cluster ensures protection from external attacks. A PBF policy (e.g., VACL) in this scenario can redirect the server-originated traffic to the appropriate firewall cluster depending on the policy(ies) defined by the user. The firewall cluster that provides access to the internal clients can be, for example, a router with firewall capabilities. This provides the following advantages, among others:

1. Offload the servers from having static routes;
2. One single point of configuration (the VLAN segment); and
3. Prevent a firewall/router from having to send interne control message protocol (ICMP) redirects.

An Example of Network Element Operation and Architecture

FIG. 1 is a flow diagram illustrating a process according to embodiments of the present invention. The policy-based forwarding process depicted in FIG. 1 begins with the receipt of a packet (step 100). Next, the packet thus received is analyzed using the filtering rules programmed into the network element (e.g., switch) that is to perform the policy-based forwarding (step 110). The results of this analysis lead to a determination as to whether the received packet meets the filtering criteria (step 120). If the receive packet does not meet the filtering criteria, the packet is passed on for further processing and/or forwarding to its destination (step 130). If the received packet meets the filtering criteria (step 120), a determination is made as to whether the network element should rewrite at least a portion of the information (e.g., some or all of the protocol information) within the packet (step 140). If this information in the received packet need not be rewritten, the packet is simply redirected to the appropriate physical port (step 150). However, if the protocol information in the received packet needs to be rewritten, the network element performs such operations (step 160), and sends the packet on its way (step 130).

With the advent of the Policy Based Forwarding (PBF) feature, it is possible, for example, to forward data between two different VLANs without using a level-3 network element such as a router. Initially, the PBF Engine is created with a MAC address. The user then configures the PBF policy (e.g., VACLs). In one embodiment, the packet to be forwarded under the PBF scheme is sent with the destination MAC address equal to the PBF engine MAC address. If this step is not taken, the rewrite operation will not occur. When the packet is ingress and is subject to the PBF policy, the packet header is rewritten (destination VLAN, source and destination MAC addresses) based on the information provided in the adjacency table. The re-written packet is then forwarded to the destination. Because no router is utilized, static address resolution protocol (ARP) entries on the involved hosts should be provided.

In one embodiment, the creation and setting of the security ACLs and adjacency information is simplified by the use of PBF, requiring only six user inputs. Once these inputs are provided this data is then committed to the hardware for forwarding. The user input corresponds to the host pairs sending/receiving packets. The six user data inputs required are, for example: ip_address, mac_address, and VLAN_id, for each host. In this embodiment, the PBF technique: (1) adds two entries to the adjacency table, via the command "set security acl adjacency" (once for each host pair); (2) creates and modifies two ACLs, via the command "commit security acl adjacency" (only once); and (3) commits the newly created entries to the hardware, via the command "set security acl ip" (once for each host pair). The command is "set pbf_map". The command "permit ip any any" is added to the end of the list (if not already present in the ACL). Each new entry created is inserted into the list prior to the "permit ip any any" statement.

As noted, FIG. 1 depicts a flow diagram illustrating a process according to an embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media, optical storage media such as compact disk media (e.g., CD-ROM, CD-R, etc.) and digital video disk storage media, nonvolatile memory storage memory including semiconductor-based memory units such as FLASH memory, EEPROM, EPROM, ROM or application specific integrated circuits, volatile storage media including registers, buffers or caches, main memory, RAM, and the like, and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 2:
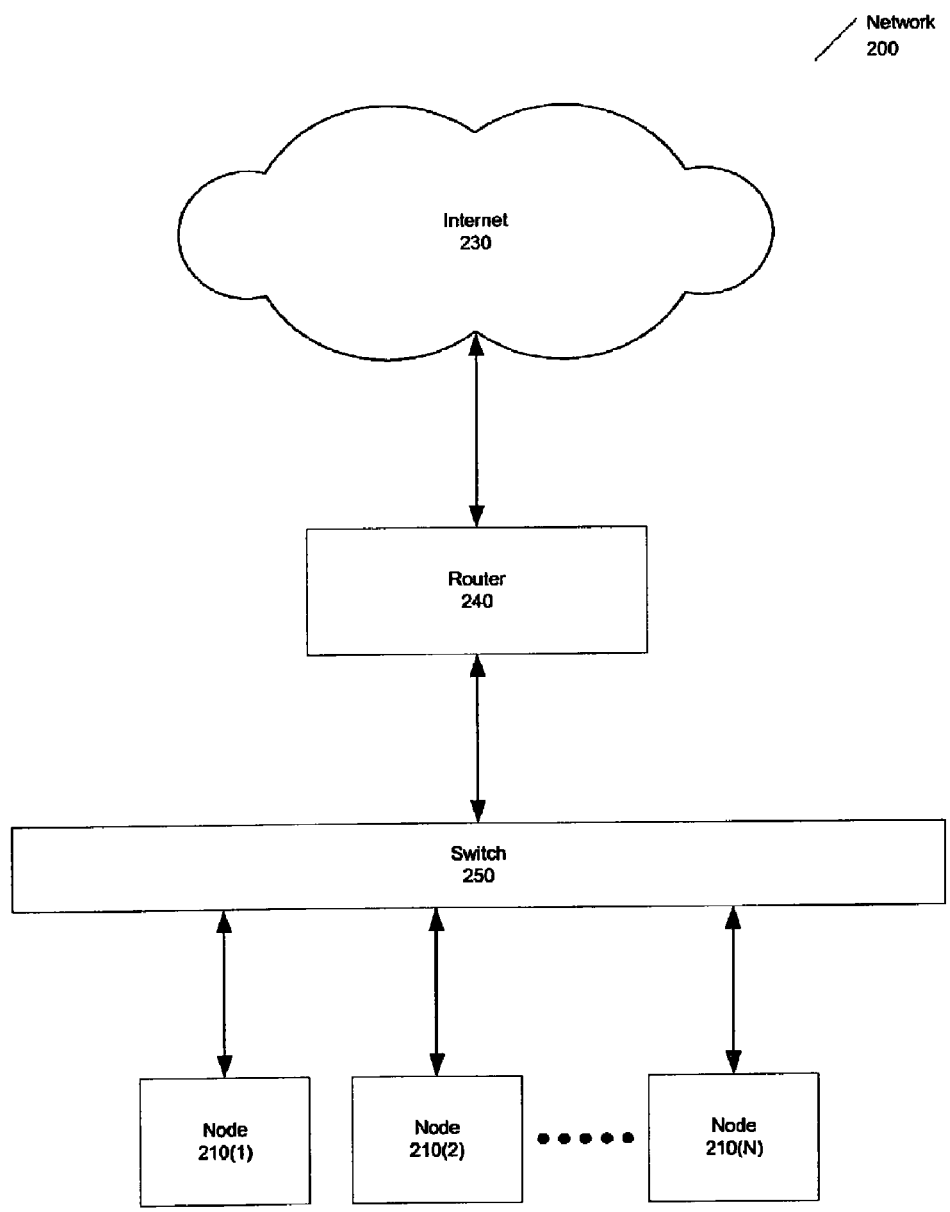
FIG. 2 is a block diagram illustrating a network according to the present invention.

FIG. 2 illustrates a network 200 according to embodiments of the present invention. Network 200 includes a number of user nodes (depicted in FIG. 2 as nodes 210(1)-(N)) coupled to an internet 230 via a router 240 and a switch 250. Router 240 and switch 250 support connectivity between nodes 210(1)-(N) and internet 230 by allowing information from one of the user nodes destined only for other user nodes to be switched through switch 250, but for information destined for nodes (e.g., in internet 230) to be routed by router 240. Switch 250 supports processes according to embodiments of the present invention, so as to perform policy-based forwarding (e.g., to perform a process such as that depicted in FIG. 1). Such a configuration requires additional hardware structures, as well as revised software, when compared to a conventional switch. It will be noted that, in a more general sense, the structures and process of the present invention can be included in other network elements (e.g., router 240) without loss of generality or applicability, as the functionality of such network elements may be combined. It will also be noted that, while the discussion herein is in terms of a switch (i.e., switch 250), this is merely an illustrative example—the present invention could be implemented in a hub or other environment.

It will be noted that the variable identifier "N" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements has the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
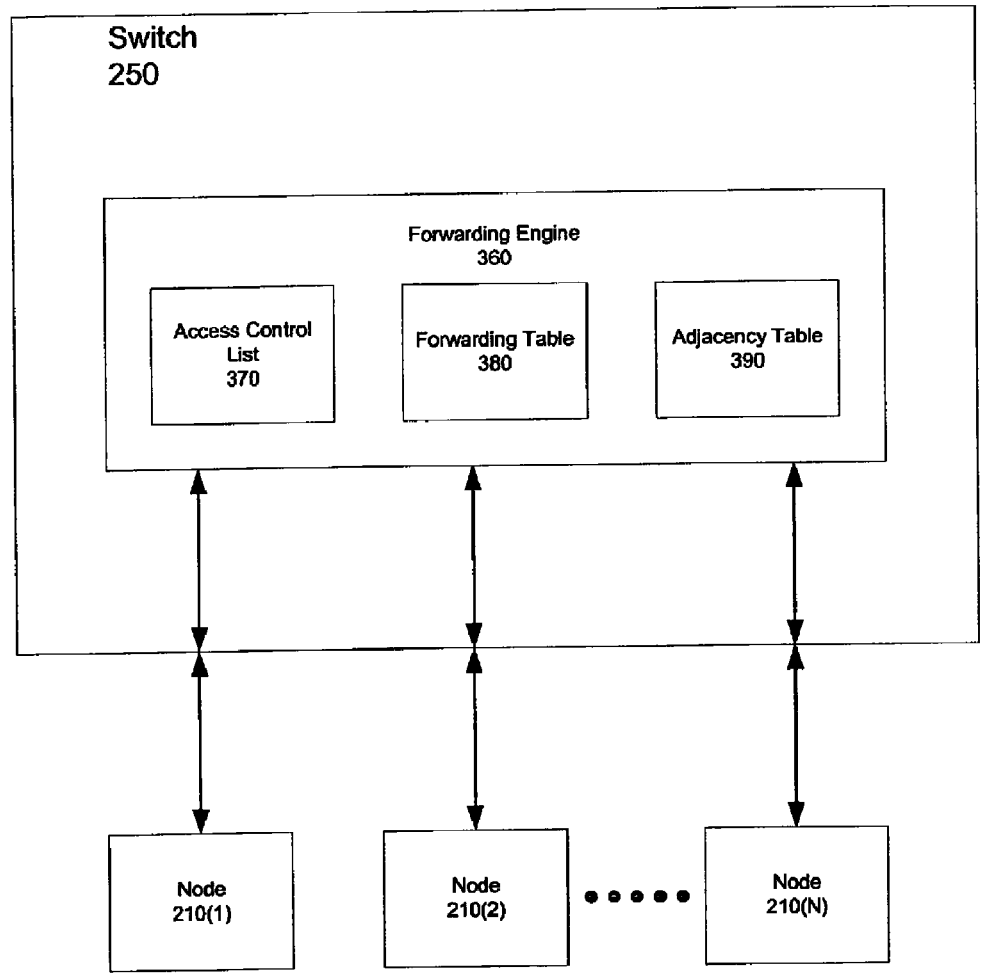
FIG. 3 is a block diagram illustrating a switch according to the present invention.

FIG. 3 is a block diagram illustrating in further detail a switch such as switch 250 of FIG. 2, having been configured to perform a process according to embodiments of the present invention. Switch 250 is now depicted as including a forwarding engine 360, which is communicatively coupled to the various ports (to which nodes 210(1)-(N) are coupled) in order to support a process such as that depicted in FIG. 1. In turn, forwarding engine 360 supports an access control list (ACL) 370, a forwarding table 380 and an adjacency table 390.

Access control list 370 is, in general terms, a list of statements that are used to restrict network traffic in some way. More specifically, an access control list is a sequential collection of permit and deny conditions that apply to one or more IP addresses. An ACL can be used to provide a relatively robust access control mechanism via basic packet filtering functions. It will be noted that, when an ACL is specific to a virtual local area network (VLAN), it is referred to as a VLAN ACL or VACL.

Forwarding table 380 is a database of information used by switch 250 to make forwarding decisions. Conceptually, forwarding table 380 is similar to a routing table. Software executing on switch 250 maintains forwarding table 380 which is, typically, stored in memory within switch 250 that allows fast access to this information (e.g., SRAM or cache memory). This can operate, for example, in the following manner. An IP address is provided, which may or may not exist in forwarding table 380. If the address exists in forwarding table 380 (and so the packet can be properly forwarded), that information is used to determine the outgoing port to which the traffic should be forwarded by accessing outgoing interface information that is stored in adjacency table 390.

Adjacency table 390, in turn, contains the MAC layer packet-header data for directly-connected next hops (i.e., those destinations that are directly connected to switch 250). Adjacency table 390 can be populated, for example, with data from an address resolution protocol (ARP) table, a frame relay map table, and other such tables. In short, adjacency table entries inform switch 250 to which interface the given packet is to be sent.

Forwarding engine 360, in the simplest terms, makes a determination as to which port (and so node) a packet is forwarded (i.e., sent). Access control list 370 and adjacency table 390 are used in determining the forwarding of those packets identified for policy-based forwarding by forwarding engine 360. Packets handled by switch 250 can take various paths, for example, a typical path and a policy-based forwarding (PBF) path (neither shown specifically in FIG. 3). As is apparent, packets normally follow their the first path, from a source user node (e.g., node 210(1)), through forwarding engine 360, to the intended destination user node (e.g., node 210(2)). These packets are the greater majority of the packets processed by switch 250, and so a process such as that depicted in FIG. 1, carried out by switch 250, has little impact on such traffic flow. However, for packets which are to be forwarded based on the given policy, an alternate path is followed, that of the PBF path. In following this path, such packets are sent from a given node to other user nodes, but are also to be forwarded to other nodes, based on the policy or policies being implemented by forwarding engine 360. Forwarding engine 360 then processes such packets and forwards these packets on to their destinations based on this information.

Figure 4:
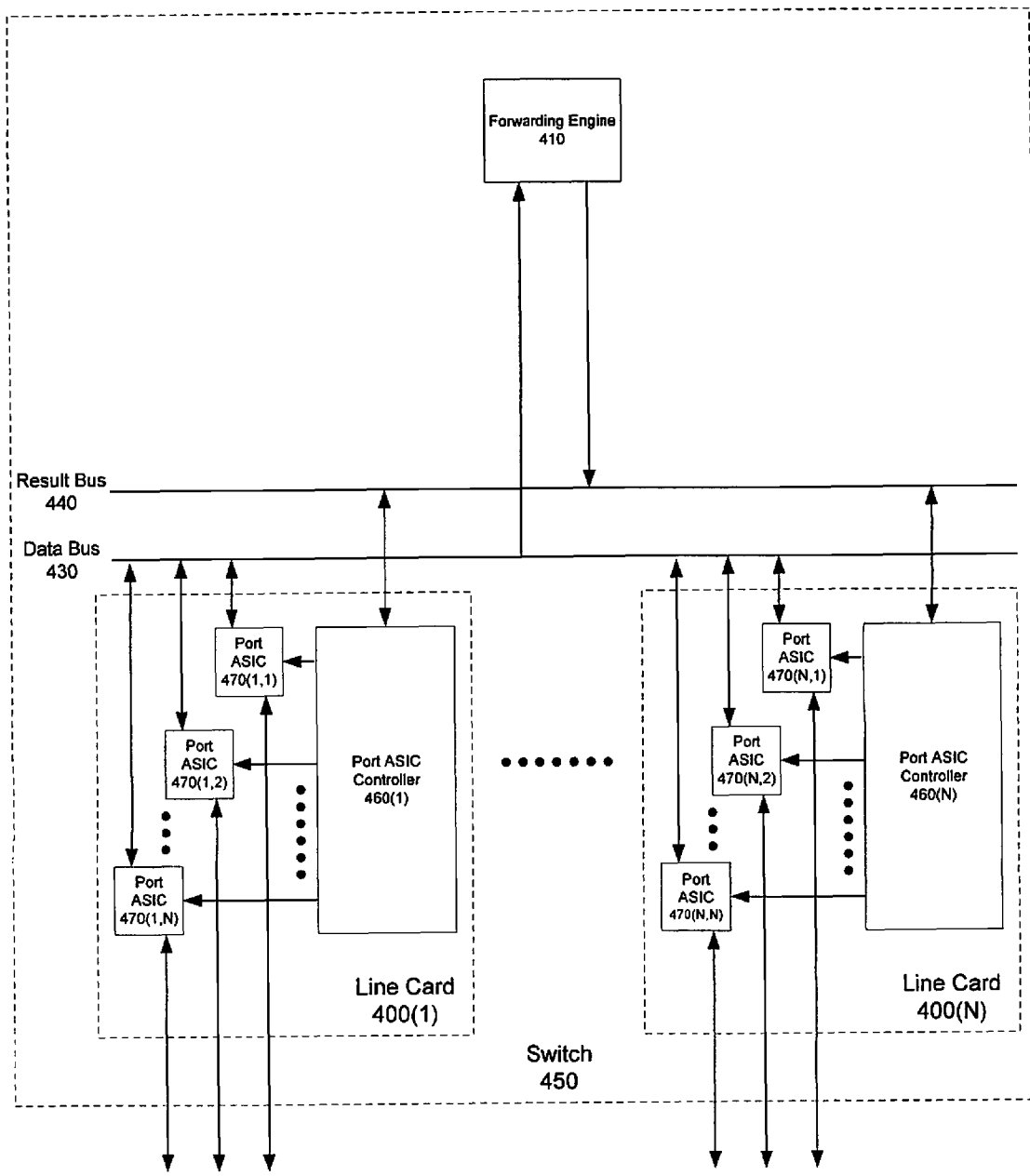
FIG. 4 is a block diagram illustrating a switch according to the present invention in greater detail.

FIG. 4 is a block diagram illustrating an example of switch 250 (a switch 450) and details pertinent to the description of embodiments of the present invention in greater detail. Switch 450, as depicted in FIG. 4, includes a number of line cards (line cards 400(1)-(N)) which are coupled to a forwarding engine 410 (in the manner of forwarding engine 360 of FIG. 3) via data bus 430 and result bus 440. Each of line cards 400(1)-(N) includes, among other structures, a number of port devices (depicted in FIG. 4 as port ASICs 470(1,1)-(N, N)) which are under the control of a port controller (depicted in FIG. 4 as being controlled by a respective one of port ASIC controllers 460(1)-(N)).

As noted in connection with FIG. 3, while a non-PBF packet is simply forwarded to its intended port, a PBF packet is identified and analyzed, in a system according to the present invention. In terms of FIG. 4, upon receipt, a packet (of either type) is sent from the one of port ASICs 470(1,1)-(N,N) at which the packet was received to those devices coupled to data bus 430 (e.g., others of port ASICs 470(1,1)-(N,N) and FE 410). FE 410 then makes a determination as to whether the packet is a PBF packet. If such is not the case, the (non-PBF) packet is forwarded by FE 410 to the intended one of port ASICs 470(1,1)-(N,N) by indicating to a corresponding one of port ASIC controllers 460(1)-(N) that the copy of the packet held in the given one of port ASICs 470(1,1)-(N,N) should be sent out on the appropriate port.

However, if the packet is to be forwarded according to the PBF scheme being implemented, the packet is processed by forwarding engine 410 and forwarded accordingly. Forwarding engine 410 analyzes the packet by determining if the packet is among those to be forwarded across VLAN boundaries. This is done by looking up the listing of a destination MAC address in a forwarding table such as forwarding table 380. If the destination MAC in the packet matches the PBF engine address programmed in the forwarding table and the packet source/destination IP address (and, in some implementations, the layer 4 (L4) ports) match an entry in an ACL table (e.g., ACL table 370), the information (e.g., forwarding information) thus determined is used to determine the outgoing interface using adjacency table 390.

In fact, in a broader sense, this operation is performed by looking up one or more packet fields (e.g., the destination and/or source MAC address, the source and/or destination IP address, the L4 protocol type (TCP, UDP, ICMP . . . ), the source and/or destination L4 ports, the L5/L7 protocol type, or the like, either singly or in combination) in the PBF policy table. If there is a match, the information returned by the PBF policy table is used to look up one or more entries in the adjacency table, in order to decide how to forward the packet, as well as what information to rewrite in the packet. Thus, this process bypasses the default forwarding decision (made by looking up one or more entries in the forwarding table) that is otherwise taken in case of policy lookup miss. As will be appreciated, the embodiments described herein are merely examples of the broader inventive concepts of the present invention, as illustrated by the possibilities described above.

One of the outgoing "interfaces" can be the VACLs responsible for providing PBF functionality. If such is the case, the traffic is also subjected to processing using the VACLs for the given destination (e.g., the "PBF engine"), and so forwarding to network nodes on the other VLAN. It should be noted that, in addition to being sent across the VLAN boundary, the traffic in question is sent to those nodes within the packet's own VLAN (as would be expected). This processing will therefore, at least to some degree, typically be under software control (depending on the architecture of FE 410, taking into consideration design decisions between hardware and software implementation, and the like).

If the packet is one to which one or more of the forwarding policies thus implemented apply, FE 410 indicates to port ASIC controllers 460(1)-(N) that the packet in question should be forwarded in a manner appropriate to the policy. Thus, FE 410 indicates to port ASIC controllers 460(1)-(N) that the packet in question should be forwarded in a particular manner, and FE 410 indicates to a corresponding one of port ASIC controllers 460(1)-(N) that the copy of the packet held in the given one of port ASICs 470(1,1)-(N,N) is sent out on the corresponding port.

It should be noted that the architecture of switch 400 is merely an example. Although switch 400 is depicted as being bus-based, such a switch can use a bus or a fabric, ASICs or network processors, and so on. Moreover, such a switch can have a single centralized forwarding engine or many distributed ones. All such cases are pertinent to the present invention. Thus, while the architecture of switch 400 is depicted as it is in FIG. 4, the actual implementation (and so the present invention) in no way limited to such an implementation.

Operation of Example Configuration

As noted, PBF functionality is configured using, for example, Virtual Local Area Network (VLAN) Access Control Lists (ACLs) (VACLs) on the switch in question. Prior to setting the VACLs, the PBF engine should be enabled. Some configuration of the hosts is necessary: because a router is not used, the address resolution protocol (ARP) table is statically added on each host that participates in PBF scheme. To accomplish this, a packet is sent with a destination media access control (MAC) address equal to that of the "PBF engine's" MAC address.

When the packet is received, if the packet is subject to the PBF policy, the packet header is re-written (re-write of destination VLAN, source and destination MAC addresses), based on the information provided in the adjacency table, and sent to the destination VLAN. Adjacency information can also be set by the user using VACL commands. Special care should be taken because VACLs are applied to both incoming and outgoing traffic (e.g., PBF policies can interfere with return traffic). It should be noted that, if the packet is subject to a PBF policy (e.g., VACL), the packet is rewritten on a different VLAN and on that VLAN the packet is subject to a DENY, than the packet should be dropped.

PBF configuration can be performed, for example, in three steps. The first of these steps is to enable the PBF engine (e.g., PBF engine 420). The second step is to configure the VACLs on the VLANs that participate in PBF. The third is to configure the hosts that will send and receive traffic over the inter-VLAN link.

The first step is enabling the PBF engine. In order to enable a PBF scheme according to the present invention, a MAC address is set for the PBF engine. This can be done using a default provided by the system, or by providing the user with the option of setting the MAC address themselves. This MAC address is needed by the hosts that are connected to one another using the PBF scheme. Network traffic is sent to this MAC address, which makes possible the traffic's switching between VLANs—otherwise, the network hardware treats the packets as normal L2 packets.

Next, VACL configuration is performed. Packets are switched between VLANs only if the packets are subject to the VACL entries that are associated with the relevant adjacency information. The PBF scheme deals with the packets that are conveyed from one host to another (and vice versa). This assumes that the hosts are in different VLANs because otherwise, a PBF scheme according to the present invention is not needed. The configuration on one VLAN needs to have an inverse on the other VLAN, in order to make possible the forwarding between VLANs. An example of PBF configuration in order to achieve communication between Host A and Host B is discussed below.

Figure 5:
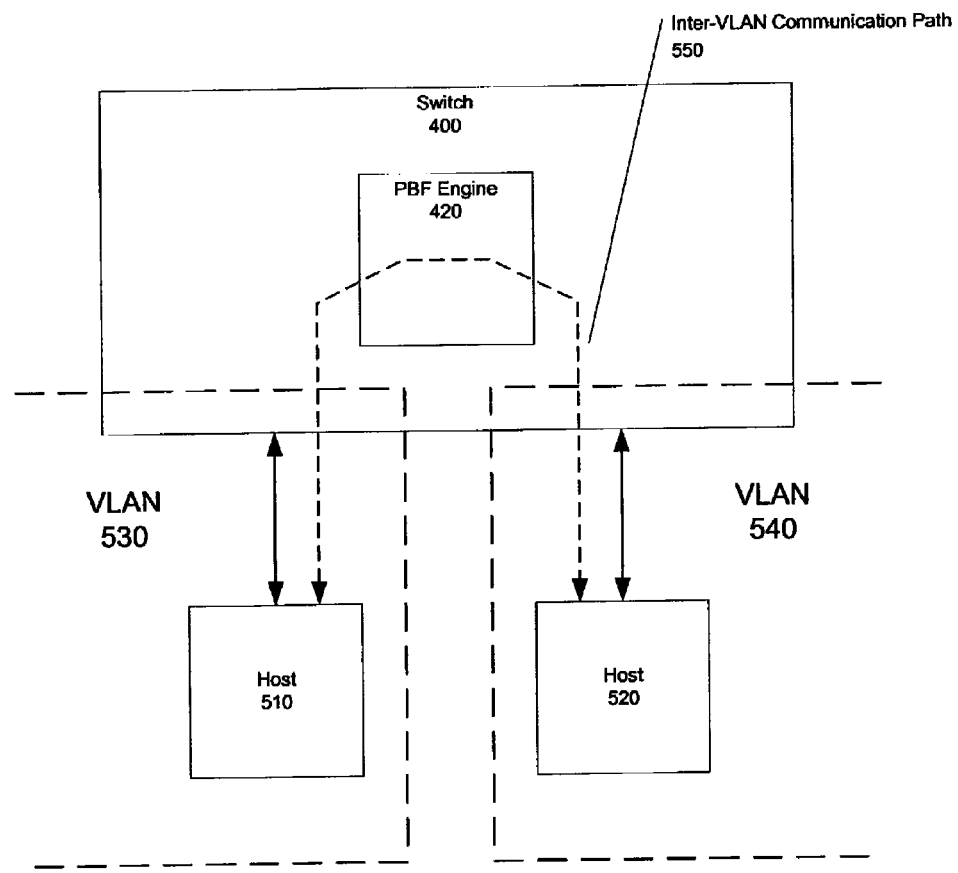
FIG. 5 is a block diagram illustrating the operation of a switch according to embodiments of the present invention.

FIG. 5 is a block diagram that illustrates the operation of switch 400, and in particular, the operation of PBF engine 420. Here, switch 400 is coupled to two (or more) hosts, depicted in FIG. 5 as a host 510 and a host 520. Hosts 510 and 520 are exemplary of nodes 210(1)-(N). Host 510 is a member of a VLAN 530, while host 520 is a member of a VLAN 540. Switch 400 supports communications among at least some of the hosts that make up VLAN 530 (e.g., host 510), as well as communications between at least some of the hosts that make up VLAN 540 (e.g., host 520). However, via PBF engine 420, switch 400 is also capable of supporting inter-VLAN communications over, for example, an inter-VLAN communication path 550. Such an inter-VLAN communication path allows communications to proceed between, for example, VLAN 530 and VLAN 540 (and, more specifically, between host 510 and host 520).

It should be noted that, while discussed in terms of inter-VLAN communication, the present invention can be generalized as being applicable to generic security domains. For example, a PBF technique according to the present invention can be used to reroute traffic within or even across such security domains by allowing intercommunication between them in a very controlled fashion. This level of control derives from PBF's detailed packet inspection capability (i.e., the selectivity provided with regard to choosing the traffic to be manipulated that is provided by a PBF technique according to the present invention).

In the example depicted in FIG. 5, switch 400 redirects traffic coming from host 510 on VLAN 530 to host 520 on VLAN 540 (and vice versa) via inter-VLAN communication path 550. The IP and MAC addresses of PBF Engine 420, as well as hosts 510 and 520, are given in Table 1.

TABLE 1

PBF engine and host IP and MAC addresses.

| Element | IP Address | MAC Address |
|---|---|---|
| PBF Engine 420 | N/A | 00-11-11-11-11-11 |
| Host 510 | 10.0.0.1 | 00-00-00-00-00-0A |
| Host 520 | 11.0.0.1 | 00-00-00-00-00-0B |

Configuration of switch 400 can include, for example, the following operations. The configuration of PBF engine 420 proceeds as follows:
set PBF mac 00-11-11-11-11-11
This command sets the PBF engine MAC address to 00-11-11-11-11-11. The "set PBF mac" command should be used with caution because setting the MAC address can make a network address "disappear"—the best approach is to use the default MAC address provided by hardware. To accomplish this, the "set pbf" command is used, and provides a unique address. Otherwise, if the MAC address is a duplicate, packets may be dropped.

The adjacency table is set by:
set security acl adjacency ADJ1 11 0-0-0-0-0-A 0-0-0-0-0-B
where 0-0-0-0-0-A is the destination MAC address, 0-0-0-0-0-B the source MAC address, and 11 the destination VLAN. Adjacency needs to be defined before setting the Access Control Entry (ACE) that is using the adjacency. The adjacency cannot be cleared prior to clearing the ACE. The flow of setting the adjacency redirect is performed in the following manner:
1. Set the adjacency information;
2. Create an entry that is using the adjacency;
3. Commit the adjacency;
4. Commit the VACL; and
5. map the VACL.

It should be noted that steps 3-4 can be performed in one step, with the command "commit security acl all". If the action is to clear the ACE entry and the adjacency:
1. Clear the ace that uses adj info that is going to be cleared
2. Commit the changes for the vacl that has ACE defined in 1.
3. Clear the adjacency
4. Commit the adjacency If the order in not respected, the VACL either is not created or will not be deleted. The logic behind this operation is driven by the fact that there is a link between adjacency information and the ACE that is rewriting the packet based on that adjacency. Adjacency information can be, for example, a node and the ACE, a leaf. In this example, the adjacencies are saved in one memory block, with no way to commit only one adjacency at a time. This is because the adjacency information is saved in one place like an ACL. The limitation thus faced is the same as that faced by committing an ACE in this scenario: an ACE cannot be committed without all the ACEs belonging to same ACL being committed.

The configuration of VLAN 530 proceeds as follows:
set security acl adjacency ADJ1 11 0-0-0-0-0-B 0-0-0-0-0-A
set security acl ip IPACL1 redirect ADJ1 host 10.0.0.1 host 11.0.0.1
set security acl ip IPACL1 permit any
commit security acl adjacency
commit security acl IPACL1
set security acl map IPACL1 10

The configuration of VLAN 540 proceeds as follows:
set security acl adjacency ADJ2 11 0-0-0-0-0-A 0-0-0-0-0-B
set security ad ip IPACL2 redirect ADJ2 host 11.0.0.1 host 10.0.0.1
set security acl ip IPACL2 permit any
commit security acl adjacency
commit security acl IPACL2
set security acl map IPACL2 11

An example of configuring a UNIX (or UNIX-like) environment can be, for example, accomplished as follows. Configuration needed on host 510 (assuming host 510 supports such an environment) assumes that hosts 510 and 520 are unaware of one another, and that a router is not present. The following is a way to set the MAC address of host 510 in the ARP table, where eth1 is the interface name.
arp-s 11.0.0.100:11:11:11:11:11-i eth0
route add 11.0.0.1 eth0
00:11:11:11:11:11 is the pbf MAC address.
Configuration for host 520:
arp-s 10.0.0.100:11:11:11:11:11-i eth1
route add 10.0.0.1 eth1

End-User Interface
Set Command
Example usage is now given. The following case is for a correct configuration.
Console>(debug-eng) set pbf
Console>(debug-eng) PBF committed successfully.
Operation successful.
Console>(debug-eng) sh pbf
Pbf status Mac address
ok 00-01-64-f8-39-18
An incorrect configuration:
Console>(debug-eng) set pbf
Console>(debug-eng) PBF committed successfully.
Operation not permitted.
Console>(debug-eng) show pbf Pbf status Mac address
present 00-01-64-41-59-3c The message "PBF committed successfully" indicates that the PBF MAC was saved in memory, while the second message "Operation not permitted" indicates that the engine wasn't created and the MAC address of the PBF was not inserted in the switch's registers.

Other commands are used to set connections. For example, the mtu can be set for cases in which jumbo frames are sent using a PBF scheme according to the present invention.

set security acl adjacency
        <adjacency_name><dest_vlan><dest_mac>[<src_mac>[mtu <mtu>] | mtu <mtu>]

Example

Console>(debug-eng)set security acl adjacency a_1 2 0-0a-0a-0a-0a-0a a_1 editbuffer modified. Use 'commit' command to apply changes.

Console>(debug-eng) show security acl info adjacency editbuffer

| set | security | acl adjacency a_1 | |
|---|---|---|---|
| 1. | 2 | 00-0a-0a-0a-0a-0a | |

Another command sets IP addresses in an ACL.

set security ad ip <acl_name><permit | deny | redirect mod_num/port_num | adjacency_name>
        <protocol><src_ip_spec><dest_ip_spec>[precedence_precedence] [tos_tos] [capture] [before editbuffer_index | modify editbuffer_index]

An example of its use appears below. This assumes that adjacency has been defined previously.

Console>(debug-eng) set security acl ip ip1 redirect a_1 ip host 44.0.0.1 host 43.0.0.1 ip1 editbuffer modified. Use 'commit' command to apply changes.

Console>(debug-eng) commit security acl ip1 ACL commit in progress.

ACL 'ip1' successfully committed.

Console>(debug-eng) show security acl info ip1

| set | security | acl | ip | ip1 |
|---|---|---|---|---|
| arp | permit 1. redirect | a_1 ip | host 44.0.0.1 | host 43.0.0.1 |

Assuming the adjacency wasn't define before

Console>(debug-eng) set security acl ip ip1 redirect a_1 ip host 44.0.0.1 host 43.0.0.1

Invalid redirect ports or adj info.

Usage: set security acl
    <acl_name><permit|deny|redirect
    <adj_name|mod_num/port_num>>
      ip <src_ip_spec><dest_ip_spec>
      [precedence <precedence>] [tos <tos>] [fragment][capture]
      [before <editbuffer_index>|modify <editbuffer_index>] [log]

ip_spec=any, host <ip_addr>, <ip_addr><mask>

Example of ip_spec is 171.20.22.123 0.0.255.255 or host 1.2.3.4 precedence=0.7,names
tos=0.15,names

As discussed, the adjacency needs to be defined before the adjacency can be used in a VACL.

Clear Command
clear PBF

Example

Console>(debug-eng) clear pbf
Console>(debug-eng) PBF cleared
Console>(debug-eng) sh pbf
Pbf status Mac address
not set 00-00-00-00-00-00 clear security acl adjacency <adj name>

Example

Console>(debug-eng) clear security acl adjacency a_1 a_1 editbuffer modified. Use 'commit' command to apply changes.

Otherwise, if the adjacency is still in use:

Console>(debug-eng) clear security acl adjacency a_3

Adj is in use by a VACL, clear the VACL first then clear adj

As explained elsewhere, an adjacency can be deleted after the VACLs is using the adjacency cease to do so.

Show Command
show PBF <adj|statistcs|map [<adj name>]>
Console>(debug-eng) show pbf statistics [<adj_name>]

This command is for determining what has been stored in an adjacency table. For example:

Console>(debug-eng) show pbf statistics

| Index | DstVlan | DstMac | SrcMac | HitCount(x) | Name |
|---|---|---|---|---|---|
| 1 | 2 | 00-0a-0a-0a-0a-0c | 00-11-22-33-44-55 | 0x000003d0 | a_3 |
| 2 | 2 | 00-0a-0a-0a-0a-0d | 00-11-22-33-44-55 | 0x000003d7 | a_4 |
| 3 | 1 | 00-20-20-20-20-20 | 00-11-22-33-44-55 | 0x0000102b | b_1 |
| 4 | 1 | 00-20-20-20-20-21 | 00-11-22-33-44-55 | 0x0000 1033 | b_2 |
| 5 | 1 | 00-20-20-20-20-22 | 00-11-22-33-44-55 | 0x0000l03b | b_3 |
| 6 | 1 | 00-20-20-20-20-23 | 00-11-22-33-44-55 | 0x00001042 | b_4 |
| 7 | 2 | 00-0a-0a-0a-0a-0a | 00-11-22-33-44-55 | 0x000003fb | a_1 |
| 8 | 2 | 00-0a-0a-0a-0a-0b | 00-11-22-33-44-55 | 0x00000402 | a_2 |

Console>(debug-eng) show pbf adjacency

| Index | DstVlan | DstMac | SrcMac | Name |
|---|---|---|---|---|
| 1 | 2 | 00-0a-0a-0a-0a-0c | 00-11-22-33-44-55 | a_3 |
| 2 | 2 | 00-0a-0a-0a-0a-0d | 00-11-22-33-44-55 | a_4 |
| 3 | 1 | 00-20-20-20-20-20 | 00-11-22-33-44-55 5 | b_1 |
| 4 | 1 | 00-20-20-20-20-21 | 00-11-22-33-44-55 | b_2 |
| 5 | 1 | 00-20-20-20-20-22 | 00-11-22-33-44-55 | b_3 |
| 6 | 1 | 00-20-20-20-20-23 | 00-11-22-33-44-55 | b_4 |
| 7 | 2 | 00-0a-0a-0a-0a-0a | 00-11-22-33-44-55 | a_1 |
| 8 | 2 | 00-0a-0a-0a-0a-0b | 00-11-22-33-44-55 | a_2 | show pbf map [<adj name>]
Console>(enable) show pbf map

| Adjacency | ACL |
|---|---|
| a__1 | ip1 |
|  | ip4 |
|  | ip6 |
| a__2 | ip1 |
|  | ip5 |

Console>(enable) show pbf map a__1

| Adjacency | ACL |
|---|---|
| a__1 | ip1 |
|  | ip4 |
|  | ip6 | show security ad info <all | adjacency| adj/acl name> [editbuffer]

This command is related to editbuffer and memory. An example is as follows:

Console>(debug-eng) show security acl info adjacency
set security acl adjacency a__3
1. 2 00-0a-0a-0a-0a-0c
set security acl adjacency a__4
1. 2 00-0a-0a-0a-0a-0d
set security acl adjacency b__1
1. 1 00-20-20-20-20-20
set security acl adjacency b__2
1. 1 00-20-20-20-20-21
set security acl adjacency b__3
1. 1 00-20-20-20-20-22
set security acl adjacency b__4
1. 1 00-20-20-20-20-23
set security ad adjacency a__1
1. 2 00-0a-0a-0a-0a-0a
set security acl adjacency a__2
1. 2 00-0a-0a-0a-0a-0b
Commit Command
commit security acl adjacency Example Console>(debug-eng) commit security acl adjacency
Commit operation in progress.
Adjacency successfully committed.

Example of Setting a Switch to Provide PBF Functionality

Incoming traffic from source MAC address 00-20-20-20-20-20 . . . 00-20-20-20-20-2f is sent to destination MAC address 00-11-22-33-44-55, with source IP address 44.0.0.1 . . . 44.0.0.17 to destination IP address 43.0.0.1 . . . 43.0.0.17, and from source MAC address 00-0a-0a-0a-0a-0a . . . 00-0a-0a-0a-0a-19 to destination MAC address 00-11-22-33-44-55, with source IP address 43.0.0.1 . . . 43.0.0.17 to destination IP address 44.0.0.1 . . . 44.0.0.17. The configuration file from the switch (e.g., switch 400) deal with the first 4 cases are (44.0.0.1 . . . 44.0.0.4; 43.0.0.1 . . . 43.0.0.4):

security ACLs
clear security acl all
adj set
set security acl adjacency a__1 2 00-0a-0a-0a-0a-0a
set security acl adjacency a__2 2 00-0a-0a-0a-0a-0b
set security acl adjacency a__3 2 00-0a-0a-0a-0a-0c
set security acl adjacency a__4 2 00-0a-0a-0a-0a-0d
set security acl adjacency b__1 1 00-20-20-20-20-20
set security acl adjacency b__2 1 00-20-20-20-20-21
set security acl adjacency b__3 1 00-20-20-20-20-22
set security acl adjacency b__4 1 00-20-20-20-20-23
ip1
set security acl ip ip1 permit arp
set security acl ip ip1 redirect a__1 ip host 44.0.0.1 host 43.0.0.1
set security acl ip ip1 redirect a__2 ip host 44.0.0.2 host 43.0.0.2
set security acl ip ip1 redirect a__3 ip host 44.0.0.3 host 43.0.0.3
set security acl ip ip1 redirect a__4 ip host 44.0.0.4 host 43.0.0.4
set security acl ip ip1 permit ip any any
ip2
set security acl ip ip2 permit arp
set security acl ip ip2 redirect b__1 ip host 43.0.0.1 host 44.0.0.1
set security acl ip ip2 redirect b__2 ip host 43.0.0.2 host 44.0.0.2
set security acl ip ip2 redirect b__3 ip host 43.0.0.3 host 44.0.0.3
set security acl ip ip2 redirect b__4 ip host 43.0.0.4 host 44.0.0.4
set security acl ip ip2 permit ip any any
pbf set
set pbf mac 00-11-22-33-44-55

commit security acl all
set security acl map ip1 1
set security acl map ip2 2

The MAC addresses learned by switch could be seen with the following command, for the port of switch 400 coupled to VLAN 530:

Console>(debug-eng) show cam dynamic 6/17
*=Static Entry. +=Permanent Entry. #=System Entry. R=Router Entry.
X=Port Security Entry $=Dot1x Security Entry

| VLAN | Dest MAC/Route Des [CoS] | Dest Ports/VCs | [Protocol Type] |
|---|---|---|---|
| 1 | 00-20-20-20-20-23 | 6/17 | [ALL] |
| 1 | 00-20-20-20-20-22 | 6/17 | [ALL] |
| 1 | 00-20-20-20-20-21 | 6/17 | [ALL] |
| 1 | 00-20-20-20-20-20 | 6/17 | [ALL] |
| 1 | 00-20-20-20-20-27 | 6/17 | [ALL] |
| 1 | 00-20-20-20-20-26 | 6/17 | [ALL] |
| 1 | 00-20-20-20-20-25 | 6/17 | [ALL] |
| 1 | 00-20-20-20-20-24 | 6/17 | [ALL] |
| 1 | 00-20-20-20-20-2b | 6/17 | [ALL] |
| 1 | 00-20-20-20-20-2a | 6/17 | [ALL] |
| 1 | 00-20-20-20-20-29 | 6/17 | [ALL] |
| 1 | 00-20-20-20-20-28 | 6/17 | [ALL] |
| 1 | 00-20-20-20-20-2f | 6/17 | [ALL] |
| 1 | 00-20-20-20-20-2e | 6/17 | [ALL] |
| 1 | 00-20-20-20-20-2d | 6/17 | [ALL] |
| 1 | 00-20-20-20-20-2c | 6/17 | [ALL] |

Total Matching CAM Entries Displayed for 6/17 = 16 for the port of switch 400 coupled to VLAN 540:
Console>(debug-eng) show cam dynamic 6/9
*=Static Entry. +=Permanent Entry. #=System Entry. R=Router Entry.
X=Port Security Entry $=Dot 1x Security Entry

| VLAN | Dest MAC/Route Des [CoS] | Dest Ports/VCs | [Protocol Type] |
|---|---|---|---|
| 2 | 00-0a-0a-0a-0a-0e | 6/9 | [ALL] |
| 2 | 00-0a-0a-0a-0a-0f | 6/9 | [ALL] |
| 2 | 00-0a-0a-0a-0a-0c | 6/9 | [ALL] |
| 2 | 00-0a-0a-0a-0a-0d | 6/9 | [ALL] |
| 2 | 00-0a-0a-0a-0a-0a | 6/9 | [ALL] |
| 2 | 00-0a-0a-0a-0a-0b | 6/9 | [ALL] |
| 2 | 00-0a-0a-0a-0a-19 | 6/9 | [ALL] |
| 2 | 00-0a-0a-0a-0a-18 | 6/9 | [ALL] |
| 2 | 00-0a-0a-0a-0a-17 | 6/9 | [ALL] |
| 2 | 00-0a-0a-0a-0a-16 | 6/9 | [ALL] |
| 2 | 00-0a-0a-0a-0a-15 | 6/9 | [ALL] |
| 2 | 00-0a-0a-0a-0a-14 | 6/9 | [ALL] |
| 2 | 00-0a-0a-0a-0a-13 | 6/9 | [ALL] |
| 2 | 00-0a-0a-0a-0a-12 | 6/9 | [ALL] |
| 2 | 00-0a-0a-0a-0a-10 | 6/9 | [ALL] |

Total Matching CAM EntriesDisplayed for 6/9 = 16

Console>(debug-eng) show pbf
Pbf status Mac address
---------- -----------------
ok 00-11-22-33-44-55
Console>(debug-eng) show pbf statistics

| Index | DstVlan | DstMac | SrcMac | HitCount(hex) | Name |
|---|---|---|---|---|---|
| 1 | 2 | 00-0a-0a-0a-0a-0a | 00-11-22-33-44-55 | 0x00026d7c | a_1 |
| 2 | 2 | 00-0a-0a-0a-0a-0b | 00-11-22-33-44-55 | 0x00026d83 | a_2 |
| 3 | 2 | 00-0a-0a-0a-0a-0c | 00-11-22-33-44-55 | 0x00026d89 | a_3 |
| 4 | 2 | 00-0a-0a-0a-0a-0d | 00-11-22-33-44-55 | 0x00026d90 | a_4 |
| 5 | 1 | 00-20-20-20-20-20 | 00-11-22-33-44-55 | 0x000260e3 | b_1 |
| 6 | 1 | 00-20-20-20-20-21 | 00-11-22-33-44-55 | 0x000260ea | b_2 |
| 7 | 1 | 00-20-20-20-20-22 | 00-11-22-33-44-55 | 0x000260f1 | b_3 |
| 8 | 1 | 00-20-20-20-20-23 | 00-11-22-33-44-55 | 0x000260f8 | b_4 |

PBF Enhancement

An enhancement that can be added to a PBF according to the present invention simplifies the process of setting and committing the security ACLs and adjacency information. A "set pbf_map" command can be provided to create the security ACLs and adjacency information based on user input, and then commit the security ACLs and adjacency information to the hardware.

Within switch 400, the "set pbf_map" command creates/modifies two ACLs, identified by PBF_MAP_ACL_(VLAN_ID) (where VLAN_ID is given by the user for each of the pair VLANs), adds two entries in the adjacency table, identified by PBF_MAP_ADJ_(INDEX) (where INDEX is the index in the adjacency table), and commits the newly created entries to the hardware. The command typically has six input parameters corresponding to the pair of hosts that are to send packets to one another.

The "set pbf_map" command has two steps: Adjacency table insert and ACL create/modify.

The adjacency step creates an entry in the adjacency information table for each redirect to the adjacency ACE that will be added to the ACLs (per the next step).

The ACL create/modify step creates an ACE in each ACL for the redirect to adjacency entry, and if necessary, adds a permit ip any any to the end of the list (this happens only if the command "permit ip any any" is not already in the ACL).

An example usage of this command is now given:
set pbf_map <ip_addr_1><mac_1><vlan_1><ip_addr_2><mac_2><vlan_2>

For example, the command "set pbf_map 1.1.1.1 0-0-0-0-0-1 11 2.2.2.2 0-0-0-0-0-2 12" is equivalent with the following commands.
set security acl adjacency PBF_MAP_ADJ_0 11 0-0-0-0-0-1
set security acl adjacency PBF_MAP_ADJ_1 12 0-0-0-0-0-2
commit security acl adjacency
set security acl ip PBF_MAP_ACL_11 redirect PBF_MAP_ADJ_1 ip host 1.1.1.1 host 2.2.2.2
set security acl ip PBF_MAP_ACL_12 redirect PBF_MAP_ADJ_0 ip host 2.2.2.2 host 1.1.1.1

If "permit ip any any" is missing from the ACL, then two more entries are added:
set security acl ip PBF_MAP_ACL_11 permit ip any any
set security acl ip PBF_MAP_ACL_12 permit ip any any Continuing:
commit security acl ip PBF_MAP_ACL_11
commit security acl ip PBF_MAP_ACL_12
set security acl map PBF_MAP_ACL_11 11
set security acl map PBF_MAP_ACL_12 12

This enhancement does not change any existing command or memory-related data. Each entry in the ACL added by the "set pbf_map" is inserted before the default "permit ip any any" entry. If the user wants to add entries other then redirect to the adjacency, then the command "set security acl ip PBF_MAP_ACL_(VLAN_ID)" should be used. ACL names can be created, for example, by adding the VLAN number for the corresponding host to the string "PBF_MAP_ACL_".

The "clear pbf_map" command deletes the redirect to adjacency ACEs and adjacency information contained in PBF_MAP_ACL_(VLAN_ID). All the other types of ACEs that are part of the PBF_MAP_ACL_(VLAN_ID) ACL are cleared with the "clear security acl" command.

Command Line Interface

Set Command
set pbf_map <ip_addr_1><mac_1><vlan_1><ip_addr_2><mac_2><vlan_2>

Clear Command
clear pbf_map all | vlan <vlan> | <ip_addr_1><mac_1><vlan_1><ip_addr_2><mac_2><vlan_2>

The "clear pbf_map all" command clears the ACLs and adjacency information created by a "set pbf_map" command.

The "clear pbf_map vlan <vlan>" command clears the ACL with the name PBF_MAP_ACL_vlan_# and the adjacency table used by this ACL.

The "clear pbf_map <ip_addr_1><mac_1><vlan_1><ip_addr_2><mac_2><vlan_2>" command clears all the ACEs created by a "set pbf_map" command except "permit ip any any" entry in the ACL. This command will remove the entries that enable traffic between hosts with ip_addr_1 and ip_addr_2 on vlan_1 and vlan_2. If the entries were already deleted with a "clear security acl" command, a message is printed indicating that the specific entry was already cleared. The entries to be deleted are: two ACEs (redirect to adjacency ACEs) and the two entries in the adjacency table.

Show Command
show pbf_map all | <vlan> | config

The "show pbf_map all" command shows all the maps and statistics that were set.

The "show pbf_map <vlan>" command shows PBF-related ACEs and the statistics for each adjacency used.

The "show pbf_map config" command shows the pbf_map configuration.

Practical Configurations a PBF According to the Present Invention

Datacenter Network Design Using PBF

Figure 6A:
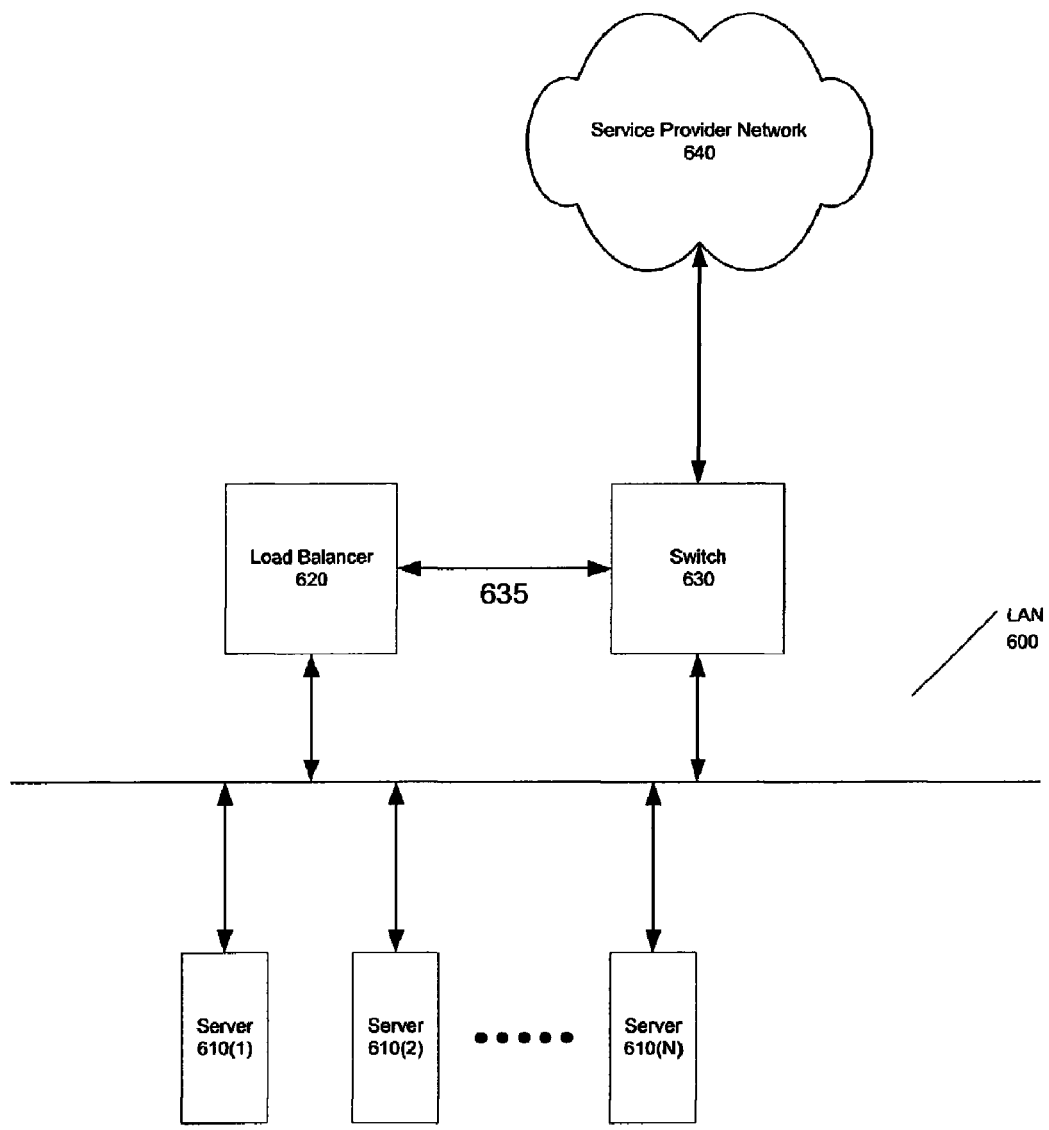
FIG. 6A is a block diagram illustrating a network configuration according to embodiments of the present invention.

A PBF (Policy Based Forwarding) feature according to the present invention can be used to intercept traffic traversing a VLAN in order for the traffic to be processed by a device other than the default gateway. For example, servers in a data center are not aware of the presence of such a device, as such servers are configured only with the default gateway address. PBF can intercept the traffic based on L3/L4 information contained therein and rewrite the destination MAC address to the MAC address of the device, providing the following advantages:

1. Transparent to servers on the network in question
2. Offloading of a router associated with the network in question
3. Saves subnet allocation in the network in question FIG. 6A is a block diagram illustrating a LAN 600 according to embodiments of the present invention. LAN 600 communicatively couples a number of servers (depicted as servers 610(1)-(N)) with a load balancer 620 and a switch 630. Additionally, load balancer 620 is communicatively coupled to switch 630 by a communications link 635. Additionally, switch 630 is coupled to a core network 640. LAN 600 represents a network design using a PBF methodology according to the present invention to redirect traffic to load balancer 620.

The PBF feature is used by LAN 600 to intercept traffic originated by servers 610(1)-(N). PBF on LAN 600 can operate in conjunction with policy-based routing (PBR) in core network 640, to identify which traffic needs to be processed by load balancer 620. It is important to note that, in the network depicted in FIG. 6A, PBF is only responsible for rewriting the packets' MAC address; the destination VLAN is the same as the source VLAN in this example.

It should be noted that, if PBF were not available, the network designer would be forced to design a network in which two different subnets are used by the load balancer interfaces, and policy based routing used instead of the scheme depicted in FIG. 6A. The load balancer would have two interfaces (rather than the single interface) connected to a router (rather than a switch), one on a first VLAN and another on a second VLAN. PBR would be used to decide whether or not the traffic requires processing by the load balancer.

Figure 6B:
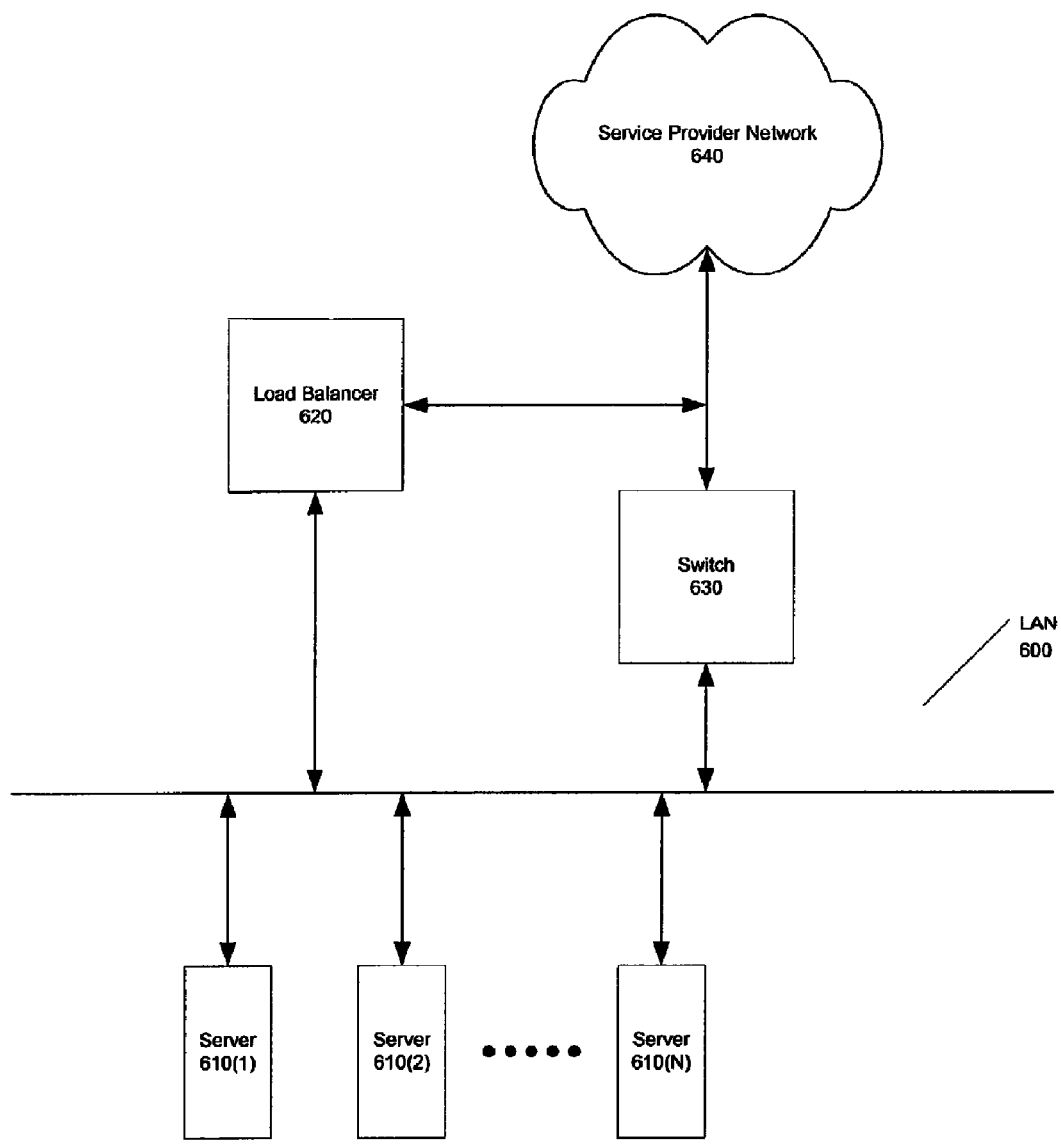
FIG. 6B is a block diagram illustrating another network configuration according to embodiments of the present invention.

FIG. 6B is a block diagram that illustrates an alternative configuration of the couplings within LAN 600. As before, servers 610(1)-(N), load balancer 620 and switch 630 are communicatively coupled to one another via LAN 600. Also as before, switch 630 is coupled to core network 640. However, in this configuration, load balancer 620, instead of being communicatively coupled to switch 630, is communicatively coupled directly to core network 640.

FIG. 6B shows, as an alternative to the configuration depicted in FIG. 6A, another way to design a data center using PBF. The network designer can remove the PBR configuration from switch 630 and use PBF on both core network 640 and LAN 600. In doing so, switch 630 is bypassed when traffic needs to be load balanced. Load balancer 620 may have limited routing capabilities, however, so this design is preferably only used when there is little routing intelligence required on the return traffic (e.g., only static routes need to be configured).

As noted previously, this type of design can be implemented using VLAN Access Control Lists (VACLs), where the user specifies the port to which the traffic is to be sent (this is referred to herein as a redirect capability). Notably, rewriting the MAC address, as performed in embodiments of the present invention, is a more flexible approach than solely redirecting traffic, in that such rewriting is not bound to a port. This is a clear advantage for devices that share a common virtual MAC address.

Firewall Load Balancing

Figure 7A:
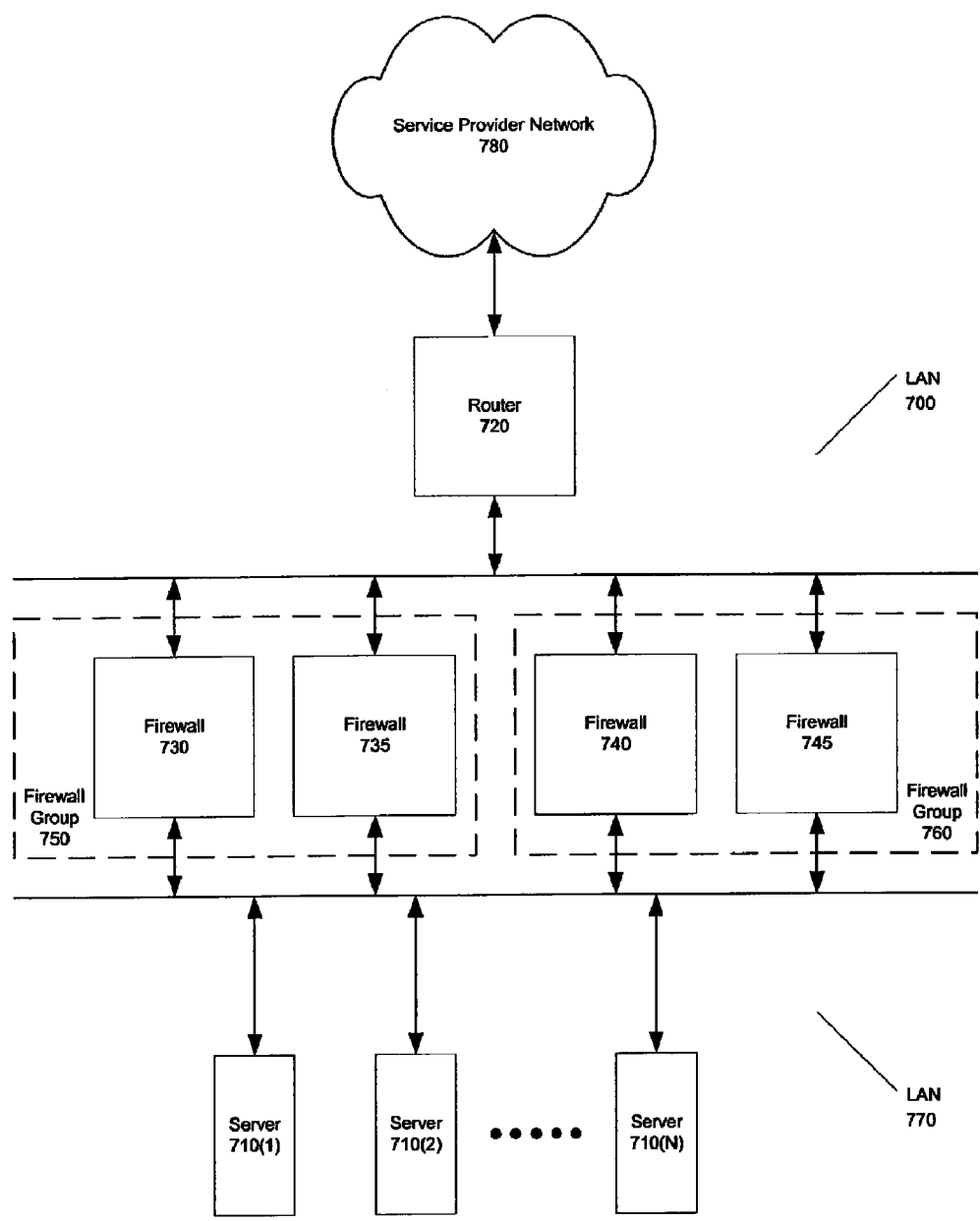
FIG. 7A is a block diagram illustrating a network configuration according to embodiments of the present invention that includes firewall groups.

FIG. 7A illustrates a network 700 in which a number of firewalls are used. In the network depicted in FIG. 7A, a LAN 700 allows communication between a number of firewalls (depicted as firewalls 730, 735, 740 and 745). LAN 700, in the case depicted in FIG. 7A, includes a number of firewalls (depicted as firewalls 730, 735, 740 and 745) which are grouped by VLAN into firewall groups (firewall groups 750 and 760, respectively). A LAN 770 provides connectivity between the firewall groups and servers 710(1)-(N). Thus, LAN 770 can be viewed as being on the "inside" of the firewall groups (and connected to servers 710(1)-(N)), while LAN 700 can be viewed as being on the "outside" of the firewall groups. Router 720 is communicatively coupled, in turn, to a service provider network 780.

As FIG. 7A depicts, PBF can also be used to achieve firewall load balancing. A cluster of firewalls (e.g., firewalls 730, 735, 740 and 745) are "front-ended" by (interfaced to service provider network 780 using) a PBR-capable router (e.g., router 720), while the back-end is simply be an L2 network (PBF-capable) aggregating servers. This PBF configuration is consistent with the PBR configuration in order to guarantee that both directions of traffic are taking the same firewall. Preferably, the firewall cluster is made up of firewall pairs (e.g., firewall groups 750 and 760), where each pair works in an "active-standby" mode and the same MAC is used by the pair, regardless of which firewall is currently active. An advantage of this is that there is no need for a router in the "back-end" configuration.

In fact, router 720 can be done away with entirely, and that portion of LAN 700 "outside" of the firewall groups coupled directly to service provider network 780. In this configuration, servers 710(1)-(N) have a default gateway defined to be one of the firewall's IP addresses. The PBF policy will take care of rewriting the destination MAC to either the MAC of the firewall group 750 or that of firewall group 760. A policy that can be used, for example, is one in which all packets having an even destination IP address go to firewall group 750, and all packets having an odd destination IP address go to firewall group 760. On the "outside", a PBR ACL will do the same for the source IP address: mapping packets having an even source IP address to firewall group 750 and odd source IP address to firewall group 760. Thus, in the configuration depicted in FIG. 7A, the use of PBF replaces the PBR-capable router, allowing firewall groups 750 and 760 to be coupled directly to service provider network 780.

Use of PBF According to the Present Invention in a DMZ Configuration

Figure 7B:
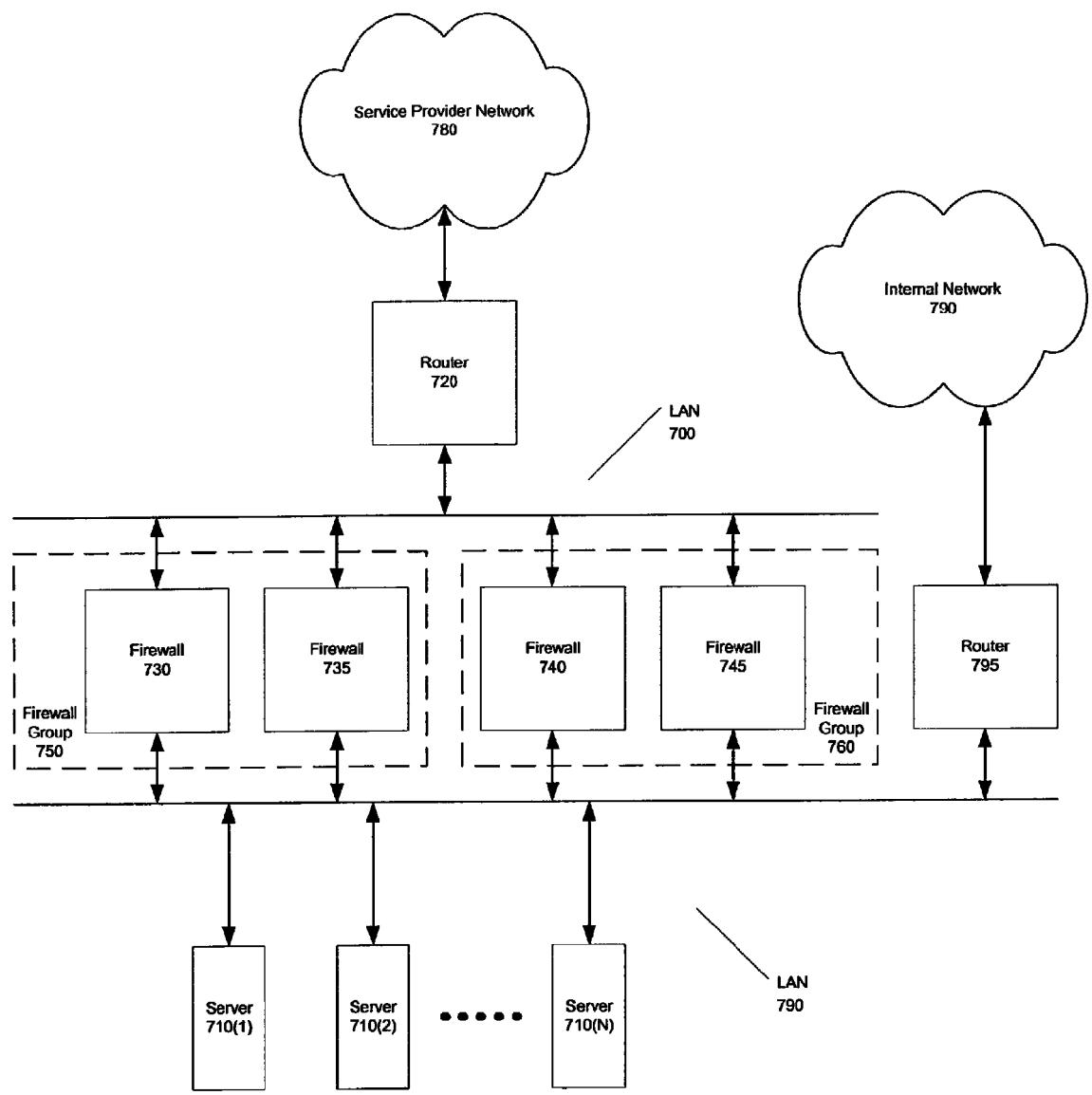
FIG. 7B is a block diagram illustrating another network configuration according to embodiments of the present invention that includes firewall groups.

FIG. 7B is a block diagram illustrating an extension of LAN 770 to include communicative coupling to an internal network (depicted in FIG. 7B by an internal network 790), making LAN 700 a DMZ (a "demilitarized zone", which is a network between an internet and an internal LAN, which acts as a buffer between the two). The LAN (depicted in FIG. 7B by a LAN 770) is coupled in a manner similar to that of LAN 700, and, in fact, the portion of LAN 770 on the "outside" of the firewall groups approximates the architecture of LAN 700. Moreover, the portion of LAN 770 on the "inside" of the firewall groups is similar to that of LAN 700, but includes a communicative coupling to internal network 790 via a router 795.

Thus, FIG. 7B depicts another possible application of PBF, having a segment of servers "front-ended" with a cluster of firewalls (firewalls 730, 735, 740 and 745) and a router (router 795). Router 795 gives privileged access to the servers (servers 710(1)-(N)) from the internal clients (e.g., internal network 790). When such a DMZ is properly designed, router 795 preferably provides at least basic firewall capabilities. Alternatively, a firewall can be placed in "front" of router 795 or router 795 can be replaced by a firewall. As before, the firewall cluster (firewalls 730, 735, 740 and 745) ensure protection from external attacks.

The PBF policy redirects traffic to the firewall cluster or the router depending on some policy defined by the user. Such a configuration provides at least the following advantages. First, such a configuration obviates the need for the servers to have static routes. Additionally, such a configuration allows for a single point of configuration (the VLAN segment). Such a configuration also prevent the router from having to send ICMP redirects. Thus, a configuration such as that shown in FIG. 7B is desirable in the DMZ scenario.

The design depicted also allows for the easy replacement of the router for the internal network with a firewall. Firewalls might not have any ICMP redirect capabilities, so the PBF will typically handle sending the traffic to the most appropriate device, while the servers will continue to send traffic to a single device.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the scope of this invention. Moreover, while the invention has been particularly shown and described with reference to these specific embodiments, it will be understood by those skilled in the art that the foregoing and other changes in the form and details may be made therein without departing from the scope of the invention. Consequently, the scope of the invention should be determined with reference to the appended claims.

What is claimed is:

1. A method comprising:
   determining, using a processor of a network device, if a packet is subject to a policy, wherein
   said packet is identified by analyzing, using said processor, said packet using a filtering rule, and
   said analyzing comprises
      determining, using said processor, whether a destination address of said packet is intended for forwarding across a boundary of a virtual local area network by looking up said destination address of said packet in a forwarding table, and
      determining, using said processor, whether said packet matches an entry in an access control list table associated with said virtual local area network using said destination address; and
   forwarding said packet, wherein said forwarding said packet comprises
   if said packet is subject to said policy,
      forwarding said packet to a policy-based forwarding engine of said network device, and
      performing said forwarding said packet based on said policy using
         said policy-based forwarding engine, wherein
         said performing said forwarding comprises rewriting said destination address based on an adjacency table, and
   if said packet is not subject to said policy,
      determining if said packet is subject to a forwarding rule, and
      if said packet is subject to said forwarding rule,
         forwarding said packet to a forwarding engine of said network device, and
         performing said forwarding based on said forwarding rule using said forwarding engine.

2. The method of claim 1, wherein
   said filtering rule is based on a plurality of a destination media access control address, a source media access control address, a destination internet protocol address, a source internet protocol address, an Open System Interconnection (OSI) layer 4 protocol type, an OSI layer 5 protocol type, and an OSI layer 7 protocol type.

3. The method of claim 1, further comprising:
   determining if a portion of information in said packet is to be re-written.

4. The method of claim 3, wherein
   said portion of said packet is at least some of protocol information of said packet.

5. The method of claim 3, wherein said forwarding said packet based on said policy comprises:
   redirecting said packet to a physical port, if said portion of information in said packet is not to be re-written; and
   re-writing said portion of said information in said packet, if said portion of information in said packet is to be re-written.

6. The method of claim 5, wherein
   said portion of said packet is at least a portion of protocol information of said packet.

7. The method of claim 1, wherein said identifying comprises:
   searching in a forwarding table for a first destination address matching a destination address in said packet; and
   if said first destination address matching said destination address in said packet is found, determining if said first destination address matches a policy-based forwarding engine address of said policy-based forwarding engine.

8. The method of claim 7, wherein said identifying further comprises:
   if said first destination address matches said policy-based forwarding engine address, determining if a second destination address matches a destination address in said access control list entry in said access control list table.

9. The method of claim 7, wherein said identifying further comprises:
   if said first destination address matches said policy-based forwarding engine address, determining if a source address matches a source address in an access control list entry in access control list table.

10. The method of claim 7, wherein said identifying further comprises:
    if said first destination address matches said policy-based forwarding engine address, determining if a port address matches a port address in an access control list entry in access control list table.

11. The method of claim 7, wherein said determining generates forwarding information, and further comprising:
   accessing said adjacency table using said forwarding information to determine an outgoing interface, if said first destination address matches said policy-based forwarding engine address.

12. The method of claim 11, further comprising:
   using said forwarding information to access an adjacency table in order to determine an outgoing interface.

13. The method of claim 12, wherein said forwarding comprises:
   sending said packet to said outgoing interface.

14. A network element comprising:
   a policy-based forwarding engine, wherein;
      said policy-based forwarding engine is configured to implement policy-based forwarding, and
      said policy-based forwarding engine is configured to rewrite a destination address of a packet based on an adjacency table; and
   a forwarding engine, wherein
      said forwarding engine and said policy-based forwarding engine are coupled to receive a packet,
      said forwarding engine comprises a forwarding table,
      said forwarding table is configured to store a first destination address in an access control list associated with a virtual local area network,
      said forwarding engine is configured to determine if said packet is subject to a policy,
      said forwarding engine is configured to identify said packet by analyzing said packet using a filtering rule,
      said forwarding engine is configured to analyze said packet by determining whether a destination address of said packet is intended for forwarding across a boundary of a virtual local area network by looking up said destination address of said packet in said forwarding table, and
      said forwarding engine is configured to analyze said packet by determining whether said packet matches an entry in an access control list table associated with said virtual local area network using said destination address,
      said forwarding engine is configured to, if said packet is not subject to said policy, determine if said packet is subject to a forwarding rule, and
      said first destination address is a destination address of a policy-based forwarding engine.

15. The apparatus of claim 14, wherein
   said first destination address is used for comparison with a destination address of said packet.

16. The apparatus of claim 14, wherein said forwarding engine further comprises:
   said access control list, wherein said access control list is configured to store a second destination address for comparison with a second destination address of said packet.

17. The apparatus of claim 14, wherein said forwarding engine further comprises:
   an access control list, wherein said access control list is configured to store a source address for comparison with a source address of said packet.

18. The apparatus of claim 14, wherein said forwarding engine further comprises:
   an access control list, wherein said access control list is configured to store a port address for comparison with a port address of said packet.

19. The apparatus of claim 15, wherein said forwarding engine further comprises:
   said adjacency table, wherein said adjacency table is configured to allow a determination to be made as to which one of a plurality of outgoing interfaces said packet should be sent.

20. A network element comprising:
   a processor;
   a forwarding engine, coupled to said processor;
   a policy-based forwarding engine, coupled to said processor;
   a computer readable storage medium coupled to said processor; and
   computer code, encoded in said computer readable storage medium, for operating a network and configured to cause said processor to
      determine if a packet is subject to a policy, wherein
         said packet is identified by analyzing said packet using a filtering rule,
         said analyzing comprises
            determining whether a destination address of said packet is intended for forwarding across a boundary of a virtual local area network by looking up said destination address of said packet in a forwarding table, and
            determining whether said packet matches an entry in an access control list table associated with said virtual local area network using said destination address; and
      forward said packet, wherein said forwarding said packet comprises
         if said packet is subject to said policy,
            forwarding said packet to said policy-based forwarding engine, and
            causing said policy-based forwarding engine to perform said forwarding said packet based on said policy, wherein
               said causing said forwarding comprises rewriting said destination address based on an adjacency table, and
         if said packet is not subject to said policy,
            determining if said packet is subject to a forwarding rule, and
            if said packet is subject to said forwarding rule, forwarding said packet to said forwarding engine, and
            causing said forwarding engine to perform said forwarding based on said forwarding rule.

21. The network element of claim 20, wherein
   said filtering rule is based on a plurality of a destination media access control address, a source media access control address, a destination internet protocol address, a source internet protocol address, an Open System Interconnection (OSI) layer 4 protocol type, an OSI layer 5 protocol type, and an OSI layer 7 protocol type.

22. The network element of claim 20, wherein said computer code is further configured to cause said processor to:
   determine if a portion of information in said packet is to be re-written.

23. The network element of claim 22, wherein
   said portion of said packet is at least a portion of protocol information of said packet.

24. The network element of claim 20, wherein said computer code configured to cause said processor to forward said packet based on said policy is further configured to cause said processor to:

redirect said packet to a physical port, if said portion of information in said packet is not to be re-written; and re-write said portion of said information in said packet, if said portion of information in said packet is to be re-written.

25. The network element of claim 24, wherein
said portion of said packet is at least some of protocol information of said packet.

26. The network element of claim 20, wherein said computer code configured to cause said processor to identify is further configured to cause said processor to:
search in a forwarding table for a first destination address matching a destination address in said packet; and
determine if said first destination address matches a policy-based forwarding engine address of said policy-based forwarding engine, if said first destination address matching said destination address in said packet is found.

27. The network element of claim 26, wherein said computer code configured to cause said processor to identify is further configured to cause said processor to:
determine if a second destination address matches a destination address in said access control list entry in said access control list table, if said first destination address matches said policy-based forwarding engine address.

28. The network element of claim 26, wherein said computer code configured to cause said processor to identify is further configured to cause said processor to:
determine if a source address matches a source address in an access control list entry in an access control list table, if said first destination address matches said policy-based forwarding engine address.

29. The network element of claim 26, wherein said computer code configured to cause said processor to identify is further configured to cause said processor to:
determine if a port address matches a port address in an access control list entry in an access control list table, if said first destination address matches said policy-based forwarding engine address.

30. The network element of claim 26, wherein
said computer code configured to cause said processor to determine is further configured to cause said processor to generate forwarding information, and
said computer code is further configured to cause said processor to access said adjacency table using said forwarding information to determine an outgoing interface, if said first destination address matches said policy-based forwarding engine address.

31. The network element of claim 30, wherein said computer code is further configured to cause said processor to:
use said forwarding information to access an adjacency table in order to determine an outgoing interface.

32. The network element of claim 31, wherein said computer code configured to cause said processor to forward is further configured to cause said processor to:
send said packet to said outgoing interface.

33. A non-transitory computer-readable storage medium, storing a computer program product comprising:
a first set of instructions, executable on a computer system, configured to determine if a packet is subject to a policy, wherein
said packet is identified by analyzing said packet using a filtering rule, said analyzing comprises
determining whether a destination address of said packet is intended for forwarding across a boundary of a virtual local area network by looking up said destination address of said packet in a forwarding table, and
determining whether said packet matches an entry in an access control list table associated with said virtual local area network using said destination address; and a second set of instructions, executable on said computer system, configured to forward said packet, wherein said second set of instructions is further configured to
if said packet is subject to said policy,
forward said packet to a policy-based forwarding engine, and
cause said policy-based forwarding engine to perform said forwarding said packet based on said policy, wherein
said performing said forwarding comprises rewriting said destination address based on an adjacency table, and
if said packet is not subject to said policy,
determine if said packet is subject to a forwarding rule, and
if said packet is subject to said forwarding rule,
forward said packet to a forwarding engine, and
cause said forwarding engine to perform said forwarding based on said forwarding rule.

34. The non-transitory computer-readable storage medium of claim 33, said computer program product further comprising:
a fourth set of instructions, executable on said computer system, configured to determine if a portion of information in said packet is to be re-written.

35. The non-transitory computer-readable storage medium of claim 34, wherein said portion of said packet is at least a portion of protocol information of said packet.

36. The non-transitory computer-readable storage medium of claim 33, wherein said second set of instructions comprises:
a first subset of instructions, executable on said computer system, configured to redirect said packet to a physical port, if said portion of information in said packet is not to be re-written; and
a second subset of instructions, executable on said computer system, configured to re-write said portion of said information in said packet, if said portion of information in said packet is to be re-written.

37. The non-transitory computer-readable storage medium of claim 36, wherein
said portion of said packet is at least some of protocol information of said packet.

38. The non-transitory computer-readable storage medium of claim 33, wherein said first set of instructions comprises:
a first subset of instructions, executable on said computer system, configured to search in a forwarding table for a first destination address matching a destination address in said packet; and
a second subset of instructions, executable on said computer system, configured to determine if said first destination address matches a policy-based forwarding engine address of said policy-based forwarding engine, if said first destination address matching said destination address in said packet is found.

39. The non-transitory computer-readable storage medium of claim 38, wherein said first set of instructions further comprises:
a third subset of instructions, executable on said computer system, configured to determine if a second destination address matches a destination address in said access control list entry in said access control list table, if said first destination address matches said policy-based forwarding engine address.

40. The non-transitory computer-readable storage medium of claim 38, wherein said first set of instructions further comprises:
a third subset of instructions, executable on said computer system, configured to determine if a source address matches a source address in said access control list entry in said access control list table, if said first destination address matches said policy-based forwarding engine address.

41. The non-transitory computer-readable storage medium of claim 38, wherein said first set of instructions further comprises:
a third subset of instructions, executable on said computer system, configured to determine if a port address matches a port address in said access control list entry in said access control list table, if said first destination address matches said policy-based forwarding engine address.

42. The non-transitory computer-readable storage medium of claim 38, wherein said third subset of instructions comprises a first subset of instructions, executable on said computer system, configured to generate forwarding information, and further comprising:
a fourth set of instructions, executable on said computer system, configured to access said adjacency table using said forwarding information to determine an outgoing interface, if said first destination address matches said policy-based forwarding engine address.

43. The non-transitory computer-readable storage medium of claim 42, further comprising:
a fifth set of instructions, executable on said computer system, configured to use said forwarding information to access said adjacency table in order to determine an outgoing interface.

44. The non-transitory computer-readable storage medium of claim 43, wherein said second set of instructions further comprises:
a first subset of instructions, executable on said computer system, configured to send said packet to said outgoing interface.

45. An apparatus for operating a network comprising:
a forwarding engine;
a policy-based forwarding engine;
means for determining if a packet is subject to a policy, wherein
said means for determining comprises
a means for analyzing said packet using a filtering rule,
a means for determining whether a destination address of said packet is intended for forwarding across a boundary of a virtual local area network by looking up said destination address of said packet in a forwarding table, and
a means for determining whether said packet matches an entry in an access control list table associated with said virtual local area network using said destination address; and
means for forwarding said packet, wherein said means for forwarding said packet comprises
if said packet is subject to said policy,
means for forwarding said packet to said policy-based forwarding engine, and
means for causing said policy-based forwarding engine to perform said forwarding said packet based on said policy, wherein said means for performing said forwarding comprises means for rewriting said destination address based on an adjacency table, and
if said packet is not subject to said policy,
means for determining if said packet is subject to a forwarding rule, and
if said packet is subject to a forwarding rule,
means for forwarding said packet to said forwarding engine, and
means for causing said forwarding engine to perform said forwarding based on said forwarding rule.

46. The apparatus of claim 45, wherein
means for analyzing said packet comprises said filtering rules, and
said filtering rule is based on a plurality of a destination media access control address, a source media access control address, a destination internet protocol address, a source internet protocol address, an Open System Interconnection (OSI) layer 4 protocol type, an OSI layer 5 protocol type, and an OSI layer 7 protocol type.

47. The apparatus of claim 45, further comprising:
means for determining if a portion of information in said packet is to be re-written.

48. The apparatus of claim 47, wherein
said portion of said packet is at least a portion of protocol information of said packet.

49. The apparatus of claim 47, wherein said means for forwarding said packet based on said policy comprises:
means for redirecting said packet to a physical port, if said portion of information in said packet is not to be re-written; and
means for re-writing said portion of said information in said packet, if said portion of information in said packet is to be re-written.

50. The apparatus of claim 49, wherein
said portion of said packet is at least some of protocol information of said packet.

51. The apparatus of claim 45, wherein said means for identifying comprises:
means for searching in a forwarding table for a first destination address matching a destination address in said packet; and
means for determining if said first destination address matches a policy-based forwarding engine address of said policy-based forwarding engine, if said first destination address matching said destination address in said packet is found.

52. The apparatus of claim 51, wherein said means for identifying further comprises:
means for determining if a second destination address matches a destination address in an access control list entry in an access control list table, if said first destination address matches said policy-based forwarding engine address.

53. The apparatus of claim 51, wherein said means for identifying further comprises:
means for determining if a source address matches a source address in an access control list entry in an access control list table, if said first destination address matches said policy-based forwarding engine address.

54. The apparatus of claim 51, wherein said means for identifying further comprises:

means for determining if a port address matches a port address in said access control list entry in said access control list table, if said first destination address matches said policy-based forwarding engine address.

55. The apparatus of claim 51, wherein said means for determining generates forwarding information, and further comprising:

means for accessing said adjacency table using said forwarding information to determine an outgoing interface, if said first destination address matches said policy-based forwarding engine address.

56. The apparatus of claim 55, further comprising:

means for using said forwarding information to access an adjacency table in order to determine an outgoing interface.

57. The apparatus of claim 56, wherein said means for forwarding comprises:

means for sending said packet to said outgoing interface.

* * * * *